Patented Jan. 19, 1926.

1,570,418

UNITED STATES PATENT OFFICE.

ULRICH WEGENER, OF BERLIN-STEGLITZ, GERMANY.

PRESERVED YEAST AND PROCESS OF MAKING IT.

No Drawing.   Application filed March 21, 1925.   Serial No. 17,430.

*To all whom it may concern:*

Be it known that I, ULRICH WEGENER, a citizen of the German Republic, and resident of Berlin-Steglitz, Germany, have invented certain new and useful Improvements in Preserved Yeast and Processes of Making It, of which the following is a specification.

It is well-known that yeast in its natural condition lacks stability, and various attempts have been made to preserve yeast, either by packing it in a special way, or by partial drying, or by the addition of various substances. Only a limited degree of success has been achieved in this direction hitherto, the treatments either having only a temporary effect, or being of prohibitive cost.

I have found that yeast may be preserved in an efficient condition for a long time, at a relatively insignificant cost, by thoroughly mixing or enveloping it with crystals of invert sugar. The sugar acts to protect the yeast against the access of air and other deleterious agents or influences. The best results are obtained if the invert sugar is used in a slightly alkaline condition, and not in an acid condition. The resulting mixture of yeast and invert sugar should preferably contain at least 65% of sugar and not more than 25% of water, the mass or mixture then forming a compact stable substance, which according to the percentage of water contained therein will be of paste-like consistency or harder, even to the point where it can not be cut readily. Since the yeast is thoroughly embedded in the finely crystalline mass of invert sugar, it is well protected and will retain its characteristics and particularly its fermenting power for an indefinite length of time. Whenever it is desired to use the yeast thus preserved, the protecting mass of invert sugar is removed by dissolving it in water or other suitable liquid, and the yeast thus liberated is ready to exert its usual functions at once. In numerous cases, the joint use of sugar and yeast is desired, so that my invention provides a very convenient means of supplying both ingredients at the same time.

At the time the mixture of yeast and invert sugar is prepared, the mass is a viscid liquid which may (without further treatment) be poured into cardboard boxes or other containers in which the product is to be stored and shipped; or the mass may be poured into suitable molds to form it into tablets, cubes, blocks etc. The action of the invert sugar crystals with which the mass has been inoculated will cause the mass to solidify in a short time, whereupon it is ready for storage and shipment.

Without desiring to restrict myself to the exact details I am about to give, I will now describe, as an example, one way of carrying out my present invention. I melt sugar (which may be beet sugar, cane sugar, or glucose, etc.) at a temperature of say from 70° to 80° centigrade in a water bath (the sugar being in an open vessel). The sugar is inverted in any well known or approved manner (addition of acid), but preferably at the end of the melting operation I add a sufficient amount of a suitable agent (for instance, ammonia) to render the melt either neutral or even alkaline. The melt is then allowed to cool to room temperature, at which it remains a thick liquid, like syrup. This liquid, which for convenience I will term the invert sugar melt, I mix with the yeast. The latter may be the usual compressed yeast of commerce, containing from about 60% to 70% of water. Of such yeast, I may employ about 20 parts by weight, to about 70 parts by weight of the invert sugar melt. The liquid, which originally was quite thick, becomes much thinner in from two to five minutes. When this change has taken place, the mass is ready for the final step of the treatment, which consists in adding (to the 90 parts mentioned above) about 10 parts by weight of what I term the "inoculating mass."

This inoculating mass is prepared as follows: I take invert sugar melt of the same kind as described above, and mix it with solid invert sugar such as is obtainable in commerce, using about twice as much invert sugar melt (by weight) as solid invert sugar. This two-to-one mixture is conveniently produced in a machine of the character of an ordinary meat-chopper.

Having thus produced the "inoculating mass" (which contains fine crystals), I mix it, in about the proportion stated above, with the mixture of yeast and invert sugar melt, and this completes the operation, the resulting mass being molded, if desired, as has been mentioned, it being understood that such molding must be performed soon after inoculation, since the mass then solidifies quickly.

Various modifications may be made without departing from the nature of my invention as set forth in the appended claims.

I claim:

1. The process of preserving yeast, which consists in embedding it in a finely crystalline mass of invert sugar, the sugar content being at least 65% of the entire mixture or body.

2. The process of preserving yeast, which consists in embedding it in a finely crystalline mass of invert sugar.

3. The process of preserving yeast, which consists in mixing it with a liquid melt of invert sugar, and inoculating the mixture with invert sugar crystals.

4. The process of preserving yeast, which consists in mixing it with a liquid melt of invert sugar, and inoculating the mixture with a mass composed of invert sugar melt and solid invert sugar.

5. As a new article of manufacture, a compact body containing yeast embedded in invert sugar.

6. As a new article of manufacture, a compact body containing yeast embedded in invert sugar, such sugar constituting at least 65% of said body.

7. As a new article of manufacture, a compact body containing yeast embedded in invert sugar, such sugar constituting at least 65% of said body, and the latter containing not more than 25% of water.

In testimony whereof I have hereunto set my hand.

ULRICH WEGENER.